P. MUELLER & A. C. SCHUERMANN.
BEARING FOR TAPPING MACHINES.
APPLICATION FILED JUNE 7, 1917.
1,280,813.
Patented Oct. 8, 1918.
2 SHEETS—SHEET 2.
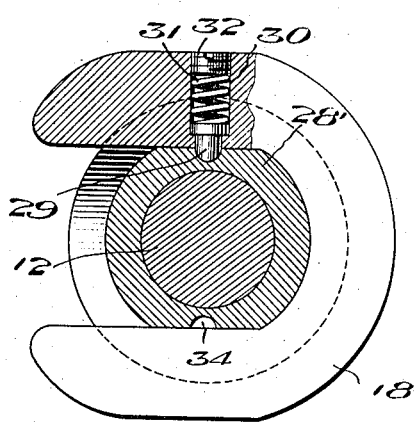
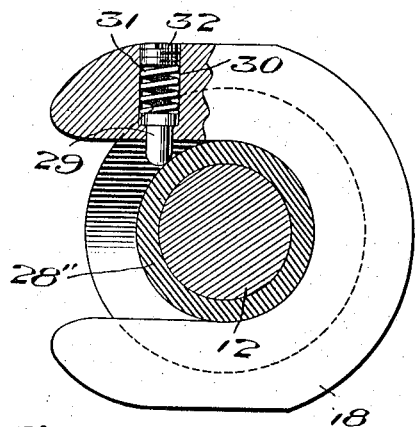
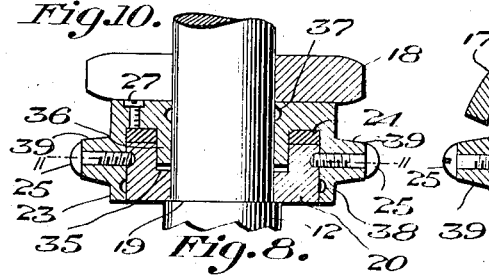
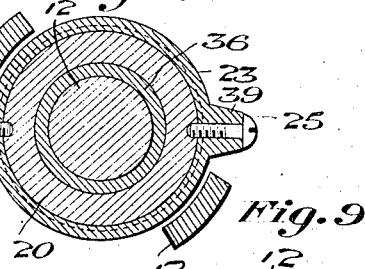
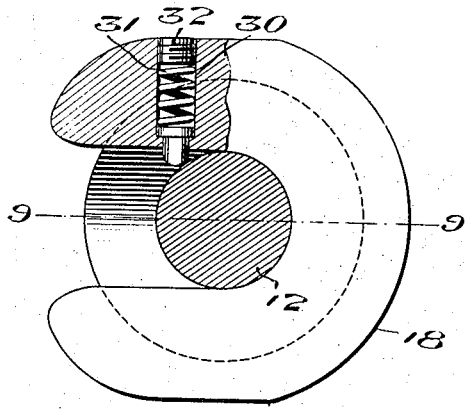
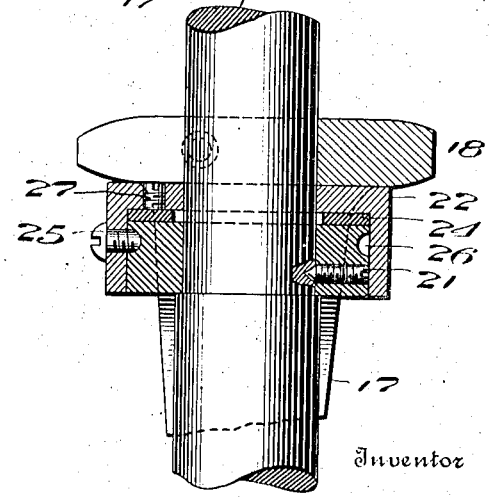
Witnesses
Philip E. Barnes
Inventor
Philip Mueller
Anton C. Schuermann
By
Attorney

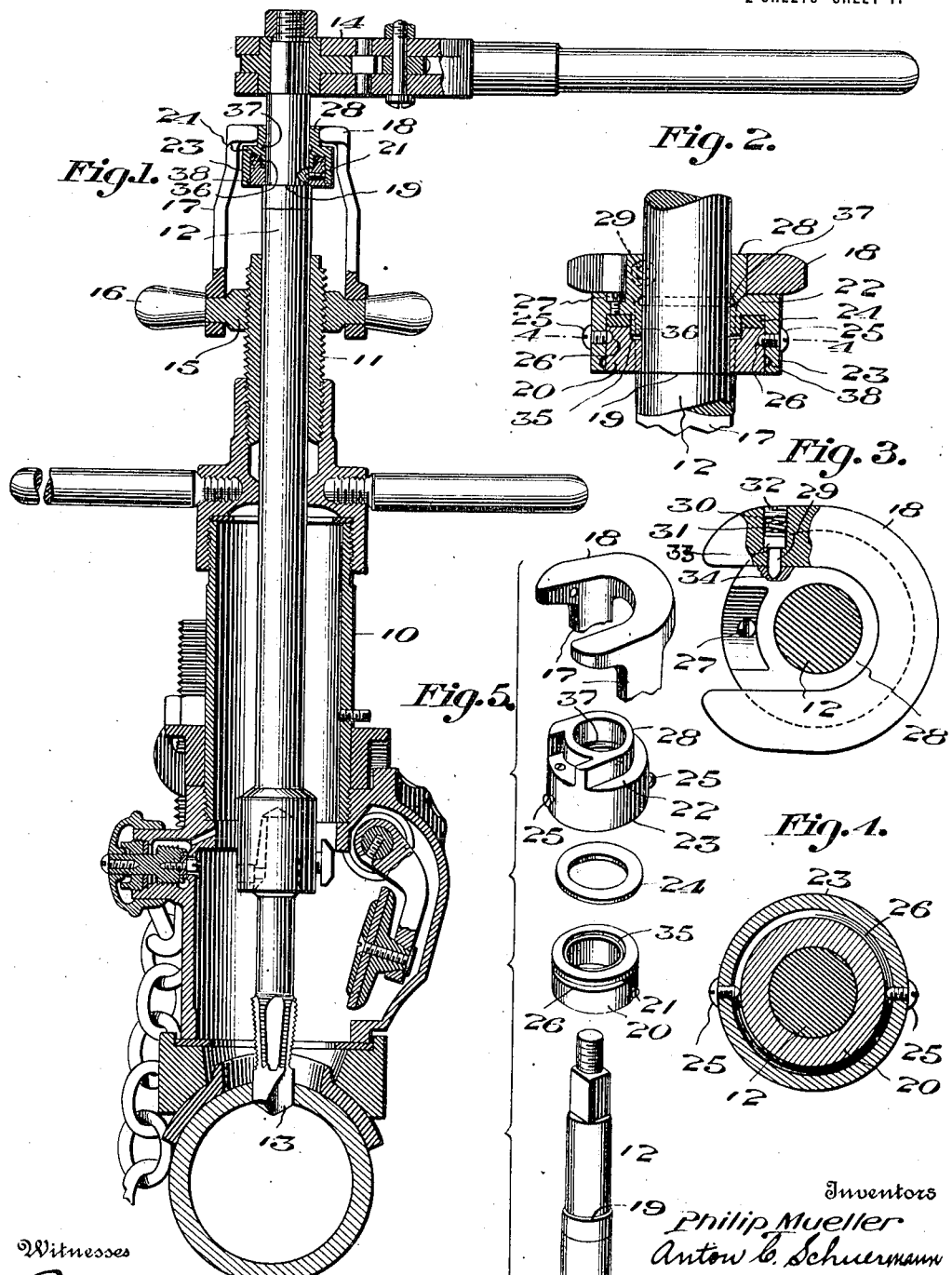

UNITED STATES PATENT OFFICE.

PHILIP MUELLER AND ANTON C. SCHUERMANN, OF DECATUR, ILLINOIS.

BEARING FOR TAPPING-MACHINES.

1,280,813.    Specification of Letters Patent.    Patented Oct. 8, 1918.

Application filed June 7, 1917. Serial No. 173,321.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Bearings for Tapping-Machines, of which the following is a specification.

This invention relates to tapping machines, and has particular reference to improved means for reducing friction between the boring bar and the means for feeding this bar forwardly.

In the present illustrative disclosure of our invention we have shown our improvements embodied in a tapping machine of the well-known type comprising a boring bar having an abutment adjacent its outer end and carrying a drill at its forward end, a feed-screw through which the bar passes, a feed-collar or nut in threaded engagement with the feed-screw and pivotally carrying a yoke having a bifurcated plate or disk adapted to straddle the bar and engage against the abutment thereon, and means for rotating the boring bar. When the nut is rotated in the proper direction upon the feed-screw or shaft, the yoke is brought to bear against the abutment on the bar, so that the bar together with the drill carried thereby are advanced toward the work or pipe operated upon.

In this type of machine it has been found that the friction between the feed-yoke, which is normally stationary, and the abutment on the boring bar, which is substantially continuously rotated during the cutting operation of this machine, is considerable, and the efficiency of the machine is impaired in that additional power is required to overcome this element of friction. Furthermore, these machines are frequently used in places or excavations where sand, dirt and the like find their way in between the bearing surfaces on the yoke and abutment on the bar and when this occurs the bearing surfaces are ground away by the gritty matter and become rough so that it is often necessary to renew these parts, and the coefficient of friction is greatly increased.

It is the main purpose of this invention to overcome the above difficulties by interposing improved bearing means between the feed-yoke and the abutment on the boring bar, so that friction therebetween and wear on the parts are reduced to a minimum.

Our improved bearing is very simple in structure, efficient in operation, and may be readily applied to tapping machines now in use without materially changing the construction of the machine. The construction of the bearing is such that the parts may be securely fastened together so that accidental displacement and loss of the parts is guarded against. The bearing surfaces are housed in such manner as to prevent the lodgment of dirt and the like between the bearing surfaces.

It is a further object of the invention to provide means for preventing accidental withdrawal of the feed-yoke from engagement about the boring-bar or the bearing carried thereon.

The above and other objects of our invention are obtained in the structure described in the following specification and illustrated in the accompanying drawings, it being understood, however, that the present disclosure of our invention is not restrictive but is by way of illustration only, and our improvements may be embodied in other types of boring machines than that illustrated in the drawings.

In said drawings,—

Figure 1 is a longitudinal sectional view taken centrally through a tapping machine of the type above described and showing our improvement applied thereto.

Fig. 2 is a fragmentary view taken on a plane at right angles to Fig. 1 and showing our improved bearing in section interposed between the feed-yoke and the abutment on the boring-bar.

Fig. 3 is a sectional view taken transversely through the boring-bar immediately outside of the yoke, a part of the yoke being broken away to clearly disclose the means for maintaining the yoke against accidental withdrawal from about the boring bar.

Fig. 4 is a transverse sectional view on line 4—4, Fig. 2.

Fig. 5 is a perspective view of the parts of our improved bearing and fragments of the yoke and boring-bar, these parts being disclosed in dissassembling position.

Figs. 6, 7 and 8 are views similar to Fig. 3, but illustrate slightly different constructions.

Fig. 9 is a sectional view taken on line 9—9, Fig. 8.

Fig. 10 is a view similar to Fig. 2, and shows another embodiment of our invention.

Fig. 11 is a transverse sectional view on line 11—11, Fig. 10.

Referring to the drawings wherein like numerals represent like parts in the several views, 10 designates the casing or body portion of a tapping machine of any suitable construction, that shown in the drawings being by way of illustration only, and as this part of the machine forms no part of our invention, it is not deemed necessary to describe the same in detail.

Secured to the outer end of the casing 10 of the tapping machine is an externally threaded stuffing-nut or feed-screw 11 having a central bore through which passes a boring bar 12. This bar carries at its inner or forward end, a drill 13 which when the bar 12 is rotated bites or cuts into the pipe to which the tapping machine is connected. Mounted upon the outer end of the boring bar is means for rotating the same, and while in the present illustrative disclosure of our invention, we have shown this means as comprising a ratchet handle 14, it is to be understood that any suitable means for intermittently or continuously rotating the bar may be employed.

In threaded engagement with the feed-screw 11 is a feed-nut 15 having radially disposed handles 16 to permit ready rotation of the nut. Pivotally connected to the feed-nut 15 is a feed-yoke 17 having a slotted or bifurcated disk or plate 18 adapted to straddle the boring bar 12 as clearly shown in Fig. 3. The outer end of the boring bar is of reduced diameter so as to provide a shoulder 19 forming an abutment against which our improved bearing is adapted to engage.

Our improved bearing comprises, in part, a collar 20 engaging against the abutment 19 and secured to the bar 12 so as to rotate therewith by means of set screws 21. 22 designates the other collar of the bearing, and this collar has an annular skirt or flange 23 adapted to fit about the solid collar 20 and a bearing washer 24 is interposed between the collars, so as to keep the bearing surfaces free from gritty matter. The skirted or chambered collar 22 is secured against retilinear displacement relative to the collar 20 by means of set-screws 25 which extend through openings in the skirt 23 of the collar 22 and the inner ends or tips of these screws engage in a circumferential groove 26 in the collar 20, sufficient clearance between the inner ends of the screws and the groove being provided for, so as to prevent binding therebetween and permit free relative rotary movement between the collars. The skirted collar 22 is provided with a hole for lubricating the anti-friction washer 24 and to prevent this hole from clogging up, or dirt from passing therethrough to the bearing surfaces, the hole is closed by a threaded plug 27. The anti-friction washer 24 may be of any suitable material, but by preference it is of hard rubber.

The through opening of the collar 20 is preferably enlarged at its upper end so as to provide a recess 35, and the collar 22 has a depending annular flange or tubular portion 36 which is received by the recess 35. 37 designates an internal annular groove in the body portion of the collar 22, and 38 a like groove in the skirted portion of the collar 22, and these grooves are adapted to receive a hard grease. With this arrangement, the anti-friction washer 24 is protected against dirt, dust, or any gritty matter, for the hard grease in groove 37 and the depending annular flange 36 prevent foreign matters from reaching the washer from above, and the shoulder 19 and grease in the groove 38 prevent dirt from working upwardly between the parts.

Extending from the outer end of the collar 22 and preferably integral therewith is a projection 28 which, in the embodiment disclosed in Figs. 1 to 5 is U-shaped in cross-section so as to correspond to the configuration of the slot in the plate 18 of the yoke 17. By this arrangement, the chambered collar 22 is positively held against rotation when the boring bar is rotated. It is not necessary that the projection 28 be U-shaped in cross-section for, if desired, it may comprise a tubular extension 28' as shown in Fig. 6, this extension having two parallel straight sides against which the straight edges of the slot in the plate 18 engage.

In the embodiment illustrated in Figs. 10 and 11, we have shown a slightly different construction for positively retaining the skirted collar against rotation. In this embodiment the collar 20 is identical in structure to the corresponding collar shown in Figs. 1 to 5, and the skirted collar 22' is similar to collar 22 except that the projection 28 is omitted, and the collar 22' is provided with radially extending bosses 39. The bosses 39 are bored and threaded for the reception of retaining screws 25. The bosses 39 extend outwardly sufficient distances to engage the arms of the yoke 17, as clearly shown in Fig. 11.

The arrangements disclosed in the embodiments shown in Figs. 1 to 6, and 10 and 11, may be used when it is desired that the yoke 17 positively retain the collars 22 and 22' stationary, and thus prevent wear between the contacting surfaces of the yoke and the collars. However, it is not absolutely necessary to positively retain the collars 22 and 22' against rotation for the pressure of the yoke 17 upon the chambered collar 22 will prevent the latter from rotating with the boring bar 12, this being especially true as the resistance between the collars of the bearing and the anti-friction washer is usually less than that between the plate 18 and the collar 22. Therefore, if desired, and as shown in the embodiment illustrated in Fig. 7, the projection 28'' may be circular in cross-section and this projection serves the sole purpose of preventing the yoke or the hereinafter described locking pin carried thereby from contacting with and causing wear of the boring bar. In Figs. 8 and 9, the projection on the outer end of the collar 22 is entirely omitted.

To prevent accidental withdrawal of the yoke from the bar we provide the yoke with an improved retaining means comprising, in part, a spring-pressed plunger or pin 29. As clearly shown in Figs. 3, 6, 7 and 8, one of the forks of the bifurcated disk or plate 18 of the yoke 17 is provided with a through bore or opening 30 for the reception of the plunger or pin 29, and a coil-spring 31 normally urging the plunger against the projection 28 of the collar 22 (Figs. 3, 6 and 7), or the boring-bar 12 (Fig. 8). The spring 31 and plunger 29 are retained in place by an adjustable plug 32 threaded in the outer end of the opening 30. The inner end of the opening 30 is of reduced diameter so as to provide an abutment 33 against which the head of the plunger is adapted to engage.

In the embodiment shown in Figs. 1 to 6 the projections 28 and 28' have recesses or notches 34 in each of their straight faces in which the protruding ends of the plungers 29 are adapted to engage. By providing a recess on each side of the projections, the plunger will always be brought into registry with a recess regardless of the position of the collar 22.

In Fig. 7 the plunger engages the projection 28'', and in Figs. 8 and 9, the boring bar 12; the plunger being so located that its end must ride up the periphery of the projection on the collar 22, or the bar 12' when it is desired to swing the yoke out of operative position.

From the foregoing description, it will be noted that when operating the machine after it has been properly secured to the pipe to be tapped, the boring bar 12 is rotated, in the present instance, by the ratchet handle 14, and the drill is advanced into the work by intermittently turning the feed nut 15 upon the feed screw 11, so that the plate 18 of the yoke 17 will bear against the collar 22 of the anti-friction bearing. Due to the anti-friction washer 24 wear of the parts and friction therebetween is reduced to a minimum. In the embodiments shown in Figs. 1 to 6, 10 and 11 the collars 22 and 22' of the bearing are positively maintained against rotation relative to the feed-yoke.

It will be noted that the parts of the bearing are securely fastened together, while, at the same time, permitting free relative rotary movement thereof, and the bearing as a whole is secured to the boring bar so that accidental displacement and loss of the parts is prevented. The skirt or flange 23 of the collar 22 prevents the entrance of gritty matter between the bearing surfaces. Our improved retaining device maintains the yoke 17 against accidental withdrawal from the bar, but when it is desired to swing the yoke out of operative position, it is merely necessary to exert a lateral pull on the yoke.

It is to be understood that the present disclosure of our invention is by way of illustration, and that our invention is susceptible of various modifications and changes which would be within the spirit of the invention without departing from the scope of the following claims.

What we claim is:—

1. In a machine of the class described, the combination with a boring bar, bearing supporting means on said bar, means for advancing said bar, and a connection between said bar and said advancing means, of a bearing interposed between said bearing supporting means and said connection, said bearing comprising a first collar, a second collar having a depending skirt adapted to engage about said first collar and an anti-friction member interposed between said collars.

2. In a machine of the class described, the combination with a boring bar, bearing supporting means on said bar, means for advancing said bar, and a yoke between said bar and advancing means, of a bearing interposed between said bearing supporting means and said yoke, said bearing comprising a collar fixed to said bar, a second collar having a depending skirt adapted to engage about the first collar and an anti-friction washer between said collars.

3. In a machine of the class described, the combination with a boring bar, bearing supporting means on said bar, a feed nut, a yoke pivotally connected to said nut and having its free end bifurcated so as to straddle said boring bar, of a bearing interposed between said bearing supporting means and said feed yoke, said bearing comprising a first collar fixed to said boring bar, a second collar having means to prevent its rotation relative to said yoke, and an anti-friction member between said collars.

4. In a machine of the class described, the combination with a boring bar, bearing supporting means on said bar, a feed nut, a yoke pivotally connected to said feed nut and having a slot in its free end so as to straddle said boring bar, of a bearing interposed between said bearing supporting means and said feed yoke, said bearing comprising a first collar fixed to said boring bar, a second collar having a projection adapted to engage in the slot in said yoke, and an anti-friction member between said collars.

5. In a machine of the class described, the combination with a boring bar, bearing supporting means on said bar, a feed nut for advancing said bar, a yoke pivotally connected to said nut and having its free end bifurcated so as to straddle the boring bar, of a bearing interposed between said bearing supporting means and said yoke, said bearing comprising a collar fixed to said bar, a second collar having a projection with a portion of its perimeter straight to correspond to a portion of the bifurcated yoke so as to prevent relative rotation between the yoke and the second collar, and an anti-friction member interposed between said collars.

6. In a machine of the class described, the combination with a boring bar having an abutment thereon, means for advancing said bar, and a yoke between said bar and advancing means, of a bearing interposed between the abutment on said bar and said yoke, said bearing comprising a collar fixed to said bar and having a circumferential groove, a second collar having a depending skirt adapted to engage about the fixed collar, an anti-friction washer between said collars, and a pin extending through said skirt and engaging in the circumferential groove of said fixed collar so as to prevent rectilinear displacement between said collars.

7. In a machine of the class described, the combination with a boring bar having an abutment thereon, means for advancing said bar, and a yoke interposed between said bar and said advancing means, of a bearing interposed between the abutment on said bar and said yoke, said bearing comprising a collar fixed to said bar, a second collar having a depending skirt adapted to engage about the fixed collar, an anti-friction washer between said collars, and means for preventing rectilinear displacement between said collars while admitting of rotary movement therebetween, said second collar having a projection adapted to engage against said yoke so that said collar is maintained against rotation relative to said yoke.

8. In a machine of the class described, a boring bar having an abutment thereon, a feed nut, a yoke pivotally connected to said nut and having its free end bifurcated so as to straddle said boring bar, the free end of said yoke having an opening, a plunger in said opening adapted to extend into the slot of said yoke, a spring in the opening for normally urging said plunger into said slot, a bearing interposed between the abutment on said bar and said feed yoke, said bearing comprising a collar fixed to said boring bar, a second collar, and an anti-friction member between said collars, said second collar having a projection provided with a recess for the reception of the end of said plunger.

9. In a machine of the class described, the combination with a boring bar, bearing supporting means on said bar, a feed nut, a yoke pivotally connected to said feed nut and having a slot in its free end so as to straddle said boring bar, of a bearing interposed between said bearing supporting means and said feed yoke, said bearing comprising a first collar fixed to said boring bar, a second collar having a projection adapted to engage said yoke, and an anti-friction member between said collars.

10. In a machine of the class described, the combination with a boring bar, bearing supporting means on said bar, means for advancing said bar, and a connection between said bar and said advancing means, of a bearing interposed between said bearing supporting means and said connection, said bearing comprising a first collar having an annular recess or groove, a second collar having a depending skirt adapted to engage about said first collar and also having a depending annular flange engaging in the recess of said first collar, and an anti-friction member interposed between said collars.

11. In a machine of the class described, the combination with a boring bar having an abutment thereon, means for advancing said bar and a yoke between said bar and advancing means, of a bearing interposed between the abutment on said bar and said yoke, said bearing comprising a fixed collar having an annular groove or recess, a second collar having a depending skirt adapted to engage about the first collar and also having a depending annular flange engaging in the recess of said first collar, said second collar and said bar having therebetween a groove for receiving a grease packing, said skirt and said first collar having therebetween a groove for receiving a grease packing, and an anti-friction washer between said collars.

In testimony whereof we have hereunto set our hands in presence of two subscribing witnesses.

PHILIP MUELLER.
A. C. SCHUERMANN.

Witnesses:
CHAT. WINEGARDNER,
FRED E. KLINCK.